(12) United States Patent
McNeill et al.

(10) Patent No.: US 8,586,122 B2
(45) Date of Patent: *Nov. 19, 2013

(54) COMPOSITION SUITABLE FOR USE IN BAKING

(75) Inventors: Gerald Patrick McNeill, Channahon, IL (US); Anthony George Herzing, Channahon, IL (US); Harold Kazier, Channahon, IL (US)

(73) Assignee: Loders Croklaan USA LLC, Channahon, IL (US)

( * ) Notice: Subject to any disclaimer, the term of this patent is extended or adjusted under 35 U.S.C. 154(b) by 854 days.

This patent is subject to a terminal disclaimer.

(21) Appl. No.: 11/878,715

(22) Filed: Jul. 26, 2007

(65) Prior Publication Data

US 2009/0029024 A1 Jan. 29, 2009

(51) Int. Cl.
*A23D 7/00* (2006.01)
*A23D 9/00* (2006.01)

(52) U.S. Cl.
USPC .................... 426/607; 426/556; 426/601

(58) Field of Classification Search
USPC ................................ 426/549, 607
See application file for complete search history.

(56) References Cited

U.S. PATENT DOCUMENTS

| | | | |
|---|---|---|---|
| 3,519,440 A * | 7/1970 | Campbell et al. | 426/116 |
| 4,447,462 A | 5/1984 | Tafuri et al. | |
| 5,807,542 A * | 9/1998 | Challis et al. | 424/59 |
| 5,879,735 A * | 3/1999 | Cain et al. | 426/603 |
| 5,968,584 A * | 10/1999 | Cain et al. | 426/607 |
| 6,863,911 B2 * | 3/2005 | Zimeri et al. | 426/94 |
| 7,611,744 B2 * | 11/2009 | Cain et al. | 426/606 |
| 7,645,473 B2 * | 1/2010 | Herzing et al. | 426/607 |
| 7,794,773 B2 * | 9/2010 | Cain et al. | 426/606 |
| 2003/0124237 A1 | 7/2003 | Kuhlman et al. | |
| 2005/0276900 A1 * | 12/2005 | Ullanoormadam | 426/601 |
| 2006/0105090 A1 | 5/2006 | Cain et al. | 426/601 |

FOREIGN PATENT DOCUMENTS

| | | | |
|---|---|---|---|
| EP | 0815738 B1 * | 5/1997 | |
| EP | 0 815 738 A1 | 1/1998 | |
| EP | 1 611 794 A1 | 1/2006 | |
| WO | WO 2006/133124 | 12/2006 | |

OTHER PUBLICATIONS

The American Palm Oil Council; Palm Oil Food Products; published Apr. 4, 2004; http://web.archive.org/web/20040404003449/http://www.americanpalmoil.com/foodproducts.html.*
Baking911.com: published Feb. 23, 2005; http://web.archive.org/web/20050223153806/http://www.baking911.com/howto/dough_laminated.htm.*
Baking911.com: published Apr. 4, 2005; http://web.archive.org/web/20050404085329/http://baking911.com/pastry/croissants.htm.*
Dian: Effect of chemical interesterification on triacylglycerol and solid fat contents of palm stearin, sunflower oil and palm kernel olein blends. Eur. J. Lipid Sci. Technol., 109: 147-156. doi: 10.1002/ejlt.200600198; Publication History: Issue published online: Feb. 13, 2007, Article first published online: Feb. 13, 2007, Manuscript Accepted: Dec. 19.*
Farmani et al. "Application of palm olein in the production of zero-trans Iranian vanaspati through enzymatic interesterification" European Journal of Lipid Science and Technology 108(8):636-643 (2006).
Idris et al. "Evaluation of shortenings based on various palm oil products" Journal of the Science of Food and Agriculture 46(4):481-493 (1989).
Jackson et al. "Lipase-catalyzed randomization of fats and oils in flowing supercritical carbon dioxide" Journal of the American Oil Chemists' Society 74(6):635-639 (1997).
International Search Report and Written Opinion issued in PCT Application No. PCT/EP2008/005602.

* cited by examiner

*Primary Examiner* — Patricia George
(74) *Attorney, Agent, or Firm* — Morgan, Lewis & Bockius LLP

(57) ABSTRACT

A composition comprising:
(A) from about 20% to about 80% by weight of an interesterified palm oil olein;
(B) from about 5% to about 25% by weight of a liquid oil;
(C) from about 15 to about 75% by weight of a fat selected from the group consisting of palm oil stearins, interesterified palm oil stearins, palm oil oleins, fully hydrogenated oils and mixtures thereof may be used as a bakery fat, particularly a laminating fat for products such as puff pastry.

25 Claims, No Drawings

COMPOSITION SUITABLE FOR USE IN BAKING

This invention relates to a composition suitable for use in baking and to dough and bakery products comprising the composition.

Fat compositions which are used in baking and which may cause a layering effect in products after baking are known as laminating fats. For example, the desirable effect of layering that is achieved in bakery products such as puff pastry can be achieved using laminating fats. Puff pastry is a light, flaky pastry made from dough which contains layers of a fat such as butter or a vegetable fat. The layers of fat are usually obtained by spreading the fat on the dough, folding the dough, and rolling it out. The layered structure of the puff pastry is due at least in part to the layers of the fat. Products in which this type of structure is desirable include croissants, Danish pastries and pies. The fats are predominantly made up of triglycerides.

Triglyceride fats are often characterized in terms of their fatty acid content. The term fatty acid generally refers to straight chain carboxylic acids having from 12 to 24 carbon atoms and is used herein to refer to the carboxylic acid residues bound to the glycerol moiety in the triglyceride, and not to free carboxylic acid. Typically, the abbreviation S is used to denote a saturated fatty acid residue having 12 to 24 carbon atoms and U denotes an unsaturated fatty acid residue having 12 to 24 carbon atoms. Thus, for example, a pure triglyceride containing three saturated fatty acid residues is denoted SSS (having the same meaning as S3 or $S_3$) and a triglyceride having saturated fatty acids at the 1 and 3 positions and an unsaturated fatty acid at the 2-position is denoted SUS. S2U (or its equivalent term $S_2U$) refers to combined SSU and SUS, and SU2 (or $SU_2$) refers to combined SUU and USU. U3 (or $U_3$) refers to UUU.

WO2006/133124 describes a low trans puff pastry composition. The fat that is described is principally composed of palm olein, preferably interesterified, optionally containing a minor amount of a liquid oil.

EP-A-1611794 discloses a margarine-like fat based on interesterified palm fat for producing laminated doughs.

EP-A-0815738 relates to fat blends, in particular for filling compositions or wrapper margarine.

U.S. patent application Ser. No. 10/986,044 describes non-trans frying fats.

There remains a need for compositions that may be used as laminating fats. In particular, there remains a need for compositions that have low cost and/or good performance as laminating fats. In particular, it would be beneficial to reduce the amount of the relatively expensive interesterified oils and/or expensive fractions rich in SUS triglycerides that are contained in some laminating fats.

According to the present invention, there is provided a composition comprising:
- (A) from about 20% to about 80% by weight of an interesterified palm oil olein;
- (B) from about 5% to about 25% by weight of a liquid oil; and
- (C) from about 15 to about 75% by weight of a fat selected from the group consisting of palm oil stearins, interesterified palm oil stearins, palm oil oleins, fully hydrogenated oils and mixtures thereof.

In another aspect, the invention provides a bakery product comprising the composition of the invention.

The invention also provides, in a further aspect, the use of the composition of the invention as a fat in a bakery product.

In yet another aspect, the invention provides a dough comprising the composition of the invention.

Also provided by the invention is a method of making a bakery product which comprises forming a dough comprising the composition of the invention and baking the dough.

A yet further aspect of the invention is a method of making a composition of the invention which comprises mixing (e.g., blending) components (A), (B) and (C).

The composition of the invention has surprisingly been found to have one or more advantages, including better texture of the pastry dough (for example smooth texture and/or no hard pellets of fat), better handling of the dough (for example a reduced tendency to tearing during rolling and folding of dough), increased height of the pastry (for example, a typical minimum height of 50 mm) and improved organoleptic properties of the pastry (for example the pastry is bland and/or not waxy or greasy). A further advantage is the smoother, less lumpy texture of the composition itself which permits the formation of a more uniform distribution of fat between the layers in a laminated dough.

Preferably, the composition comprises from about 30% to about 78%, more preferably from about 50% to about 75% by weight of (A).

The composition preferably comprises from about 5% to about 10% by weight of (B), more preferably from about 5% to about 8% by weight of (B).

Preferably, the composition comprises from about 20% to about 40% by weight of (C), more preferably from about 20% to about 30% by weight of (C).

In one preferred embodiment, the composition may, for example, comprise from about 30% to about 70% by weight (A), from about 10% to about 20% by weight of (B) and from about 20% to about 60% by weight of (C).

In another preferred embodiment, the composition comprises from about 50% to about 75% by weight (A), from about 5% to about 10% by weight of (B) and from about 20% to about 40% by weight of (C).

Component (A) is an interesterified palm oil olein, preferably interesterified palm olein having an iodine value (IV) in the range of from 40 to 70. The iodine value (IV) of the interesterified palm oil olein is more preferably from about 50 to about 60.

Preferred examples of (B) are liquid vegetable oils, such as soybean oil, sunflower oil, rape seed oil, cotton seed oil, ground nut oil, safflower oil and mixtures thereof. Particularly preferred is soybean oil.

Component (C) is a fat selected from palm oil stearins, interesterified palm oil stearins, palm oil oleins, fully hydrogenated oils and mixtures thereof. Preferably, component (C) is a fat selected from palm oil stearins, interesterified palm oil stearins, fully hydrogenated oils and mixtures thereof. If palm oil olein is contained in component (C), then component (C) is preferably a mixture of palm oil olein with one or more of a palm oil stearin, an interesterified palm oil stearins and a fully hydrogenated oil.

Typically, (C) comprises fully hydrogenated oil in an amount of from about 1% to about 10%, more preferably from about 2% to about 8% by weight of the composition. Alternatively or additionally, (C) comprises a palm oil stearin having an iodine value of from about 25 to about 45, more preferably from about 30 to about 40.

Preferred examples of (C) include mixtures of palm oil stearin and fully hydrogenated palm oil, more preferably a palm oil stearin having an IV of from 25 to 45 and a fully hydrogenated (i.e., trans free or essentially trans free, for example having a content of trans fatty acids of less than 0.1% by weight based on total fatty acid residues) palm oil having an IV of less than 10, more preferably less than 5, such as less than 2.

The physical properties of fats are sometimes defined in terms of N values. These indicate the percentage of solid fat in the composition at a given temperature.

These N values are based on unstabilised fats. Thus, the term Nx refers to solid fat content at a temperature of x° C., measured by NMR pulse techniques on unstabilised fats. Unstabilised meaning that the fat was melted at 80° C., kept at 60° C. for 5 minutes, cooled to 0° C., kept at 0° C. for 1 hour and kept at measurement temperature for 30 minutes.

Preferably, the composition has an N20 of from about 20 to about 50, more preferably from about 36 to about 45. Additionally or alternatively, the composition preferably has an N40 of less than about 16, more preferably from about 3 to about 13.

Fat compositions are sometimes characterized in terms of their content of saturated fatty acids (SAFA), monounsaturated fatty acids (MUFA) and polyunsaturated fatty acids (PUFA). The composition preferably has a weight ratio of SAFA/MUFA/PUFA of (40 to 60):(30 to 40):(10 to 30).

Preferably, the compositions of the invention predominantly or exclusively comprise vegetable fats. By this, it is meant that the triglycerides are principally or wholly derived from fats from vegetable sources, either directly or indirectly, rather than being derived from animals. Typically, the compositions of the invention will comprise at least 50% by weight of triglycerides derived from vegetable sources, more preferably at least 60% by weight, such as at least 70%, at least 80%, at least 90%, at least 95% or even 100% by weight.

Compositions of the invention are preferably substantially free of trans fatty acids, including residues of free fatty acids bound as glycerides. The compositions preferably comprise trans fatty acid residues in an amount of less than 1% by weight of the fatty acids present in the triglyceride, more preferably less than 0.5% by weight, even more preferably less than 0.1% by weight.

Compositions of the invention comprise one or more components that are interesterified. Interesterification can be carried out chemically or enzymatically, preferably enzymatically. For example, (A) is preferably enzymatically interesterified. If (C) comprises interesterified palm oil stearin, this may also be enzymatically interesterified. Interesterification may be carried out by methods well known in the art and will generally result in a random distribution of fatty acid residues within the triglycerides that are present in the composition.

Components of compositions of the invention may be fractions of oils or fats, for example higher melting stearin fractions or lower melting olein fractions. Fractionation may be carried out in the presence of a solvent (such as acetone) but is preferably carried out dry i.e., in the absence of a solvent.

Preferably, compositions of the invention have a $S_2U$ content of less than 40% by weight, more preferably less than 39% by weight, even more preferably less than 38% by weight, based on the total triglycerides present in the composition, such as from 30% to 37% by weight of the total triglycerides present in the composition. Preferably, the compositions of the invention do not comprise a palm fraction having an SUS content greater than 55% by weight, more preferably greater than 60% by weight, based on the weight of the triglycerides in the palm fraction. It will be understood that S and U may be single fatty acid residues (e.g., all C16 or all C18) or, more typically, mixtures of different fatty acid residues (e.g., mixtures of C16, C18 and others). The abbreviation S is used to denote a saturated fatty acid residue having 12 to 24 carbon atoms and U denotes an unsaturated fatty acid residue having 12 to 24 carbon atoms. The term fatty acid, as used herein, refers to saturated and/or unsaturated (including mono-, di- and poly-unsaturated) straight chain carboxylic acids having from 12 to 24 carbon atoms.

The compositions of the invention may comprise mono- and/or di-glycerides but these will typically be present in smaller quantities than the triglycerides. For example, preferably less than 20% by weight, more preferably less than 10% by weight, even more preferably less than 5% by weight, such as less than 3% or less than 1% by weight of the total glycerides are mono- or di-glycerides.

The compositions of the invention are preferably suitable for use as a bakery fat and are preferably used as a bakery fats. For example, the compositions may be used (or may be suitable for use) as puff pastry fats, pie fats or croissant fats.

Compositions of the invention may be used in the production of bakery products. The bakery products preferably have a laminated structure.

The bakery products formed from compositions of the invention are generally made from dough. The dough preferably has a laminated structure. The bakery products include, for example, puff pastry, croissants, Danish pastries and pies.

Compositions of the invention may be used to form a dough. The dough comprises at least flour and water and preferably comprises flour in an amount of from 40 to 60% by weight, water in an amount of from 20 to 50% by weight and the composition of the invention in an amount of from 5 to 20% by weight based on the weight of the dough. Optionally, one or more further ingredients such as salt, flour modifier and emulsifier may be included in the dough.

The bakery products prepared according to the invention comprise the composition of the invention as a laminating fat. The dough that is used to produce the bakery product of the invention may comprise the composition of the invention as shortening, for example as described in the preceding paragraph. Alternatively, the dough may have been prepared using a fat other than the composition of the invention as shortening in the dough. In either case (i.e., whether the dough comprises a composition of the invention or not), the composition of the invention is used as a laminating fat. A laminated dough may be prepared, for instance, by a method that comprises applying the composition of the invention to a plurality of layers of the dough to form a product in which layers of dough alternate with layers of composition of the invention. Typically, the method comprises applying the composition of the invention to the dough, folding the dough and rolling the folded dough.

The doughs comprising the composition of the invention, as a laminating fat and/or as shortening, may be refrigerated, frozen or otherwise stored prior to use. The frozen dough may be packaged and sold to the consumer.

In order to form a bakery product of the invention, the laminated dough is baked, preferably in an oven. Suitable times and temperatures for baking specific bakery products will be well-known to those skilled in the art.

In the compositions, doughs and bakery products of the invention, the percentage values of the various components, together with other optional components not explicitly stated, if present, will total 100%.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise.

EXAMPLES

Example 1

A puff pastry laminating fat composition was made by blending soybean oil with melted palm oil components in the amounts shown in Table 1 below.

TABLE 1 puff pastry laminating fat composition (DP# 6413c0)

| Component | Percentage wt |
|---|---|
| Refined Bleached Deodorized Soybean Oil | 6% |
| Fully Hydrogenated Palm oil (IV < 5) | 6% |
| Interesterified palm olein (IV = 55) | 70% |
| Palm stearin (IV = 35) | 18% |
| Total | 100% |

The molten blend was then solidified by passing through a Chemetator® fat texturizer.

A laminated puff pastry dough was prepared using the laminating fat composition as described in Table 1. The proportions of ingredients used to make the puff pastry dough are listed in Table 2.

TABLE 2 puff pastry dough formula:

| Component | Percentage wt |
|---|---|
| Armstrong Patent Flour (Bread Flour) | 37.0% |
| Fat composition as dough shortening (DP# 6413c0) | 7.4% |
| Salt | 0.2% |
| Water (5-10° C.) | 25.8% |
| Laminating fat (DP# 6413c0) | 29.6% |
| Total | 100% |

Dough Preparation:

Using a 20 qt Hobart bowl with dough hook, the flour, salt and dough shortening were mixed for 1 minute at speed #1. The water was added at speed setting #1 for 1 min. This blend was allowed to mix for an additional minute at speed #2.

After mixing was complete, the dough was rested in a refrigerator (5-10° C.) for 30 minutes.

Laminating Procedure:

A Rondo Sheeter, Model # STM 503 was used for all lamination work.

The dough piece was removed from the refrigerator and rolled into a rectangular shape. The laminating fat was rolled into a rectangle approximately ⅔ the size of the dough sheet. The laminating fat was placed onto the dough sheet. The uncovered portion of the dough was folded over about ½ of the area covered by the laminating fat and a third fold was made by folding the remainder of the uncovered laminating fat over the other 2 layers.

The dough piece was lightly floured and passed through the Rondo sheeter using settings 22 to 10. The flour was dusted off the dough piece and another 3 fold (fold #1) was made as described above. This procedure was repeated 2 more times at setting 22-10 (fold 2 and #3) and the dough piece was covered with a plastic sheet and placed in the refrigerator for 30 minutes.

The dough piece was removed from the refrigerator, lightly floured and passed through the sheeter at setting 22-10. A three fold was made (fold #4), covered in plastic and retarded in the refrigerator for 30 minutes.

The dough was removed from the refrigerator, floured lightly and passed through sheeter at setting 22-5 (approx ⅛ inch thick). The dough was allowed to sit covered for 10 minutes at room temperature (21° C.)

Test Baking:

3¼ inch (83 mm) diameter circles were cut from the dough. The centers of the dough circles were removed using a patty shell tube. With the tapered shell tube in place, (2 in (bottom diameter)×1¾ (top diameter)×3 inch (height)), the dough circles were baked for 15 minutes at 400 F.

The height of baked patty shells was measured after baking.

Results:

The texture of the laminating fat was smooth (plastic), and no hard pellets of fat were present in the fat.

During lamination (rolling and folding of dough) no tearing of the dough occurred. Fat lumps were not present in the laminating fat. The fat formed an even continuous layer between the dough layers.

The heights of the pastry shells were recorded after baling. All shells had a height greater than the acceptable minimum of 50 mm.

The flavor of the pastry was bland, and did not have an undesirable waxy or greasy taste.

Example 2

Comparative

A puff pastry laminating fat composition was made by blending soybean oil with melted palm oil components in the amounts shown in Table 3 below.

TABLE 3 puff pastry laminating fat composition (DP# 6376c0)

| Component | Percentage |
|---|---|
| Refined Bleached Deodorized Soybean Oil | 13% |
| Fully Hydrogenated Palm oil (IV < 5) | 5% |
| Palm olein (IV = 55) | 40% |
| Palm stearine (IV = 35) | 42% |
| Total | 100% |

The molten blend was then solidified by passing through a Chemtator® fat texturizer.

Dough Preparation, Lamination Procedure and Baking

A laminated dough was prepared and baked in exactly as described in Example 1, except that the lamination fat formula described in Table 3 (DP#6376c0) was substituted for the laminating fat formula described in Table 1 (DP#6413c0).

Results:

The texture of the laminating fat was hard and firm and contained hard, crumbling lumps of fat that are undesirable. The fat did not form a continuous layer between the dough.

The pastry did not rise well during baking and the recorded heights of the pastry shells after baking were less than the acceptable minimum of 50 mm.

The flavor of the pastry was bland, with a slight waxy or greasy taste.

The invention claimed is:

1. Dough having a laminated structure, or bakery product made therefrom, comprising:
   flour;
   water; and
   a laminating fat composition consisting of:
   (A) from about 20% to about 80% by weight of a randomly interesterified palm oil olein;
   (B) from about 5% to about 25% by weight of an oil; and
   (C) from about 15 to about 75% by weight of a fat selected from the group consisting of palm oil stearins, interesterified palm oil stearins, non-interesterified palm oil oleins, fully hydrogenated oils and mixtures thereof.

2. The dough or bakery product as claimed in claim 1, wherein the laminating fat composition consists of:
   from about 30% to about 70% by weight (A),
   from about 10% to about 20% by weight of (B) and
   from about 20% to about 60% by weight of (C).

3. The dough or bakery product as claimed in claim 1 or claim 2, wherein the fat from the fully hydrogenated oils is palm oil.

4. The dough or bakery product as claimed in claim 1, wherein an iodine value (IV) of the interesterified palm oil olein is from about 40 to about 70.

5. The dough or bakery product as claimed in claim 1, wherein (C) consists of a palm oil stearin or an interesterified palm oil stearin having an iodine value of from about 25 to about 45.

6. The dough or bakery product as claimed in claim 1, having an N20 of from about 20 to about 50, meaning that a solid fat content of the laminating fat composition at 20° C. is from about 20 percent to about 50 percent.

7. The dough or bakery product as claimed in claim 1, having an N40 of less than about 16, meaning that a solid fat content of the laminating fat composition at 40° C. is less than about 16 percent.

8. The dough or bakery product as claimed in claim 1, wherein the laminating fat composition has a weight ratio of saturated fatty acids (SAFA)/monounsaturated fatty acids (MUFA)/polyunsaturated fatty acids (PUFA) is (40 to 60):(30 to 40):(10 to 30).

9. The dough or bakery product as claimed in claim 1 which is substantially free of trans fatty acids and glycerides thereof.

10. The dough or bakery product as claimed in claim 1, which is a bakery fat.

11. The dough or bakery product as claimed in claim 1, which is a puff pastry fat.

12. The dough or bakery product as claimed in claim 1, which is a pie fat.

13. The dough or bakery product as claimed in claim 1, which is a croissant fat.

14. The dough or bakery product as claimed in claim 1, wherein (B) is selected from the group consisting of soybean oil, sunflower oil, rape seed oil, cotton seed oil, ground nut oil, safflower oil and mixtures thereof.

15. The dough or bakery product as claimed in claim 1, wherein (A) is enzymatically interesterified.

16. The dough or bakery product as claimed in claim 1, wherein the laminating fat composition has an $S_2U$ content of less than 40% by weight of total triglycerides present in the composition.

17. The dough or bakery product as claimed in claim 1, which is selected from the group consisting of a puff pastry, croissant, Danish pastry and pie.

18. A method which comprises preparing a dough or bakery product according to claim 1 wherein the laminating fat composition is a fat component of said bakery product.

19. The method as claimed in claim 18, for improving one or more properties selected from the group consisting of texture of the pastry dough, handling of the dough, height of the pastry and organoleptic properties of the pastry.

20. A laminating fat composition consisting of:
   (A) from about 20% to about 80% by weight of a randomly interesterified palm oil olein;
   (B) from about 5% to about 25% by weight of an oil; and
   (C) from about 15 to about 75% by weight of a fat selected from the group consisting of palm oil stearins, interesterified palm oil stearins, non-interesterified palm oil oleins, fully hydrogenated oils and mixtures thereof.

21. The laminating fat composition as claimed in claim 20, consisting of:
   from about 30% to about 70% by weight (A),
   from about 10% to about 20% by weight of (B) and
   from about 20% to about 60% by weight of (C).

22. A method of making a bakery product which comprises forming a dough comprising the laminating fat composition according to claim 20 and baking the dough.

23. The method as claimed in claim 22, wherein the laminating fat composition is incorporated into the dough.

24. The method as claimed in claim 23, wherein the laminating fat composition is applied between layers of the dough.

25. A method of making the laminating fat composition according to claim 20 which comprises mixing components (A), (B) and (C).

* * * * *